(12) United States Patent
Wang et al.

(10) Patent No.: US 11,710,510 B2
(45) Date of Patent: Jul. 25, 2023

(54) VIDEO GENERATION METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventors: Yan Wang, Beijing (CN); Shu Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/706,542

(22) Filed: Mar. 28, 2022

(65) Prior Publication Data

US 2022/0223183 A1     Jul. 14, 2022

Related U.S. Application Data

(63) Continuation of application No. PCT/CN2020/116921, filed on Sep. 22, 2020.

(30) Foreign Application Priority Data

Sep. 26, 2019    (CN) ........................ 201910919296.X

(51) Int. Cl.
*G11B 27/036*      (2006.01)
*G06V 20/00*      (2022.01)
(Continued)

(52) U.S. Cl.
CPC .......... *G11B 27/036* (2013.01); *G06F 18/214* (2023.01); *G06V 20/35* (2022.01); *G10L 25/57* (2013.01); *G11B 27/10* (2013.01)

(58) Field of Classification Search
CPC ...... G11B 27/036; G11B 27/10; G06V 20/35; G06K 9/6256; G10L 25/57
See application file for complete search history.

(56) References Cited

U.S. PATENT DOCUMENTS

| | | | | |
|---|---|---|---|---|
| 7,512,886 B1 * | 3/2009 | Herberger | ............ | G11B 27/034 715/723 |
| 2008/0019610 A1 * | 1/2008 | Matsuzaka | ........... | G11B 27/034 382/284 |

(Continued)

FOREIGN PATENT DOCUMENTS

| | | |
|---|---|---|
| CN | 103793446 A | 5/2014 |
| CN | 103810504 A | 5/2014 |

(Continued)

OTHER PUBLICATIONS

International Patent Application No. PCT/CN2020/116921; Int'l Written Opinion and Search Report; dated Dec. 28, 2020; 5 pages.

(Continued)

*Primary Examiner* — Mishawn N. Hunter
(74) *Attorney, Agent, or Firm* — BakerHostetler

(57) ABSTRACT

Disclosed are a video generation method and apparatus, an electronic device, and a computer readable medium. A specific embodiment of the method comprises: obtaining a video footage and an audio footage, the video footage comprising a picture footage; determining a music point of the audio footage, the music point being used for dividing the audio footage into a plurality of audio clips; using the video footage to generate a video clip for each music clip in the audio footage to obtain a plurality of video clips, corresponding music clips and video clips having the same duration; and splicing the plurality of video clips according to the time when music clips respectively corresponding to the plurality of video clips appear in the audio footage, and (Continued)

adding the audio footage as a video audio signal to obtain a composite video.

20 Claims, 10 Drawing Sheets

(51) Int. Cl.
*G10L 25/57* (2013.01)
*G11B 27/10* (2006.01)
*G06F 18/214* (2023.01)

(56) References Cited

U.S. PATENT DOCUMENTS

| | | | |
|---|---|---|---|
| 2017/0026719 A1 | 1/2017 | Zhiwen | |
| 2017/0109585 A1* | 4/2017 | Matias | G06V 20/47 |
| 2018/0286458 A1* | 10/2018 | Harron | G06F 16/438 |

FOREIGN PATENT DOCUMENTS

| | | |
|---|---|---|
| CN | 104199841 A | 12/2014 |
| CN | 105814634 A | 7/2016 |
| CN | 108111909 A | 6/2018 |
| CN | 108202334 A | 6/2018 |
| CN | 109147771 A | 1/2019 |
| CN | 109379643 A | 2/2019 |
| CN | 110149517 A | 8/2019 |
| CN | 110233976 A | 9/2019 |
| EP | 1587111 A1 | 10/2005 |
| JP | 2005-181646 A | 7/2005 |
| JP | 2005-268991 A | 9/2005 |
| WO | WO 2015/120333 A1 | 8/2015 |

OTHER PUBLICATIONS

European Patent Application No. 20868358.1; Extended Search Report; dated Sep. 19, 2022; 9 pages.
"Self-made How to make a PV/MV Promotional music video"; https://aviutl.info/pv-mv/; Feb. 2018; accessed Jun. 7, 2023; 9 pages.

* cited by examiner

VIDEO GENERATION METHOD AND APPARATUS, ELECTRONIC DEVICE, AND COMPUTER READABLE MEDIUM

The present application is a continuation of International Patent Application No. PCT/CN2020/116921 filed on Sep. 22, 2020, which claims the priority to Chinese Patent Application No. 201910919296.X, titled "VIDEO GENERATION METHOD AND APPARATUS, ELECTRONIC DEVICE, AND COMPUTER READABLE MEDIUM", filed on Sep. 26, 2019 with the Chinese Patent Office, both of which are incorporated herein by reference in their entireties.

FIELD

The present disclosure relates to the technical field of computers, and in particular to a method and an apparatus for generating a video, and an electronic device and a computer-readable medium.

BACKGROUND

With the rapid development of multimedia technology, video processing technology is developing rapidly. Video processing software, as common software installed in terminals, has been widely used in various scenes. In many cases, users often edit a video based on materials such as a video material and a music material. However, at present, users often spend a lot of energy and time to process various materials in editing a video with video software. Therefore, the conventional method for editing a video is not simple enough for the user.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the embodiments of the present disclosure, an improved method for generating a video, an improved apparatus for generating a video, an electronic device and a computer-readable medium are provided to solve the technical problems mentioned in the background.

In a first aspect, a method for generating a video is provided according to some embodiments of the present disclosure. The method includes: obtaining an image material and an audio material, where the image material includes a picture material; determining a music point in the audio material, where the audio material is divided into multiple audio segments based on the music point; generating a video segment for each of the audio segments in the audio material using the image material to obtain multiple video segments, where an audio segment and a video segment corresponding to the audio segment have a same time length; and splicing the multiple video segments together based on time instants at which audio segments, corresponding to the video segments, respectively appear in the audio material, and adding the audio material as an audio track, to obtain a composite video.

In a second aspect, an apparatus for generating a video is provided according to some embodiments of the present disclosure. The apparatus includes: an obtaining unit, a determination unit, a generation unit, and a composite unit. The obtaining unit is configured to obtain an image material and an audio material, where the image material includes a picture material. The determination unit is configured to determine a music point in the audio material, where the audio material is divided into multiple audio segments based on the music point. The generation unit is configured to generate a video segment for each of the audio segments in the audio material using the image material to obtain multiple video segments, where an audio segment and a video segment corresponding to the audio segment have a same time length. The composite unit is configured to splice the multiple video segments together based on time instants at which audio segments, corresponding to the video segments, respectively appear in the audio material, and to add the audio material as an audio track, to obtain a composite video.

In a third aspect, an electronic device is provided according to some embodiments of the present disclosure. The electronic device includes one or more processors and a storage device. The storage device stores one or more programs. The one or more programs, when executed by the one or more processors, cause the one or more processors to perform the method provided in the first aspect.

In a fourth aspect, a computer-readable medium is provided according to some embodiments of the present disclosure. The computer-readable medium stores a computer program. The computer program, when executed by a processor, causes the processor to perform the method provided in the first aspect.

Based on the embodiments of the present disclosure, the following beneficial effects can be achieved. Video segments in the composite video are generated by performing division based on the music point, thus the time spent by the user in processing materials is reduced, and the editing process is simplified. Further, the video segments in the composite video may be generated based on a picture material, then the user can edit a video with a picture material in a case that the user has no video material or limited video material, thereby diversifying the content of the edited video.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

Figure 1A:
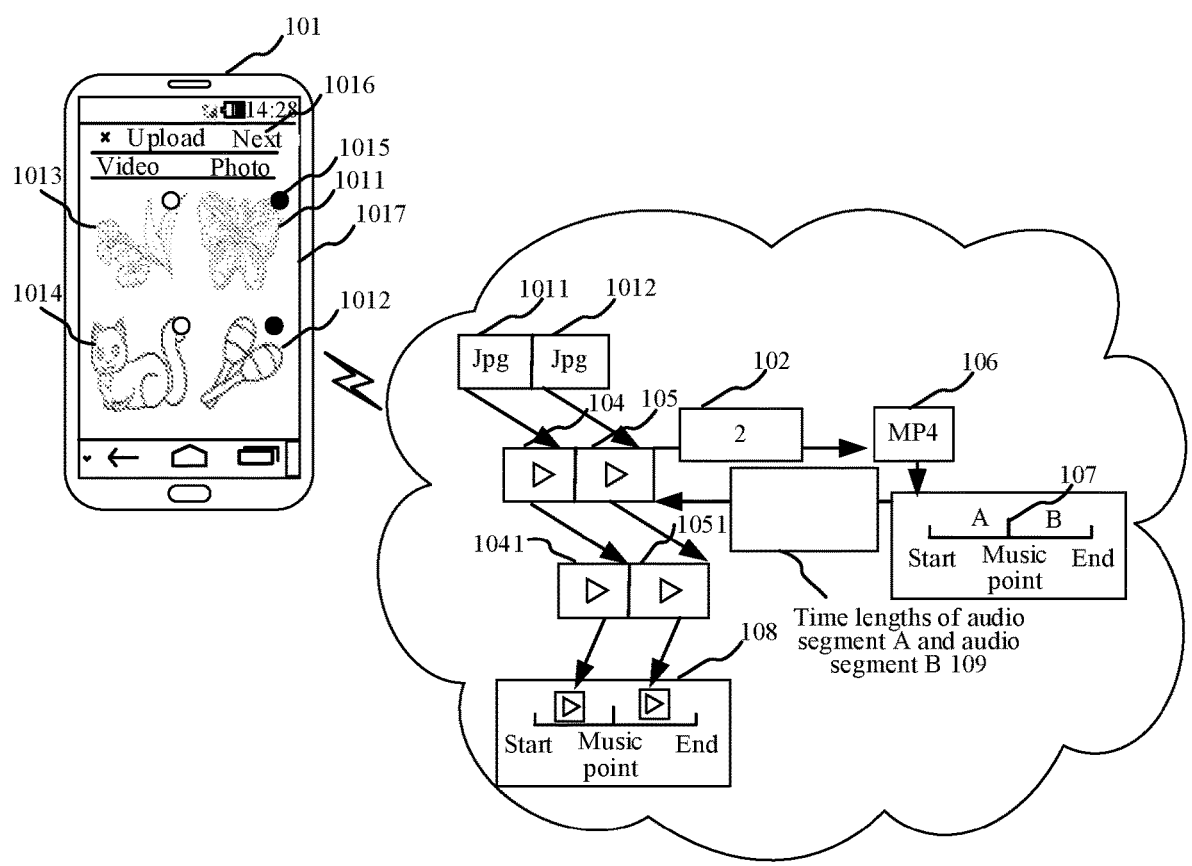
FIGS. 1A to 1D are schematic diagrams of application scenes of a method for generating a video according to some embodiments of the present disclosure.

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

In addition, it should be noted that for the convenience of description, only the parts related to the present disclosure are shown in the drawings. Embodiments of the present disclosure and features in the embodiments may be combined with each other without conflict.

Names of messages or information interacted between multiple apparatuses in the embodiments of the present disclosure are illustrative rather than limit the scope of the message or information.

Hereinafter, the present disclosure is be described in detail with reference to the accompanying drawings and in conjunction with the embodiments.

FIGS. 1A to 1D are schematic diagrams of application scenes of a method for generating a video according to some embodiments of the present disclosure. In the application scene shown in FIG. 1A, the user may select multiple image materials in an upload page 1017 on a terminal device 101. For example, the user may upload pictures 1011 to 1014 shown in the page 1017. The user may select pictures 1011 and 1012 by respectively clicking a position shown as a selection box 1015. The user clicks a button 1016 of "Next", and then the terminal device 101 generates an image material 104 based on the selected picture 1011 and generates an image material 105 based on the picture 1012. Based on the number (which is equal to two shown in FIG. 1A) of the obtained image materials, a music point 107 of an obtained audio material 106 is determined. The audio material 106 is divided into an audio segment A and an audio segment B based on the music point 107. The image material 104 is processed based on a time length of the obtained audio segment A to obtain a video segment 1041, and the image material 105 is processed based on a time length of the obtained audio segment B to obtain a video segment 1051. The video segments 1041 and 1051 are spliced together based on time instants at which the audio segments A and B respectively appear in the audio material 106, and the audio material 106 is added as an audio track of the spliced video, to obtain a composite video 108.

Figure 1B:
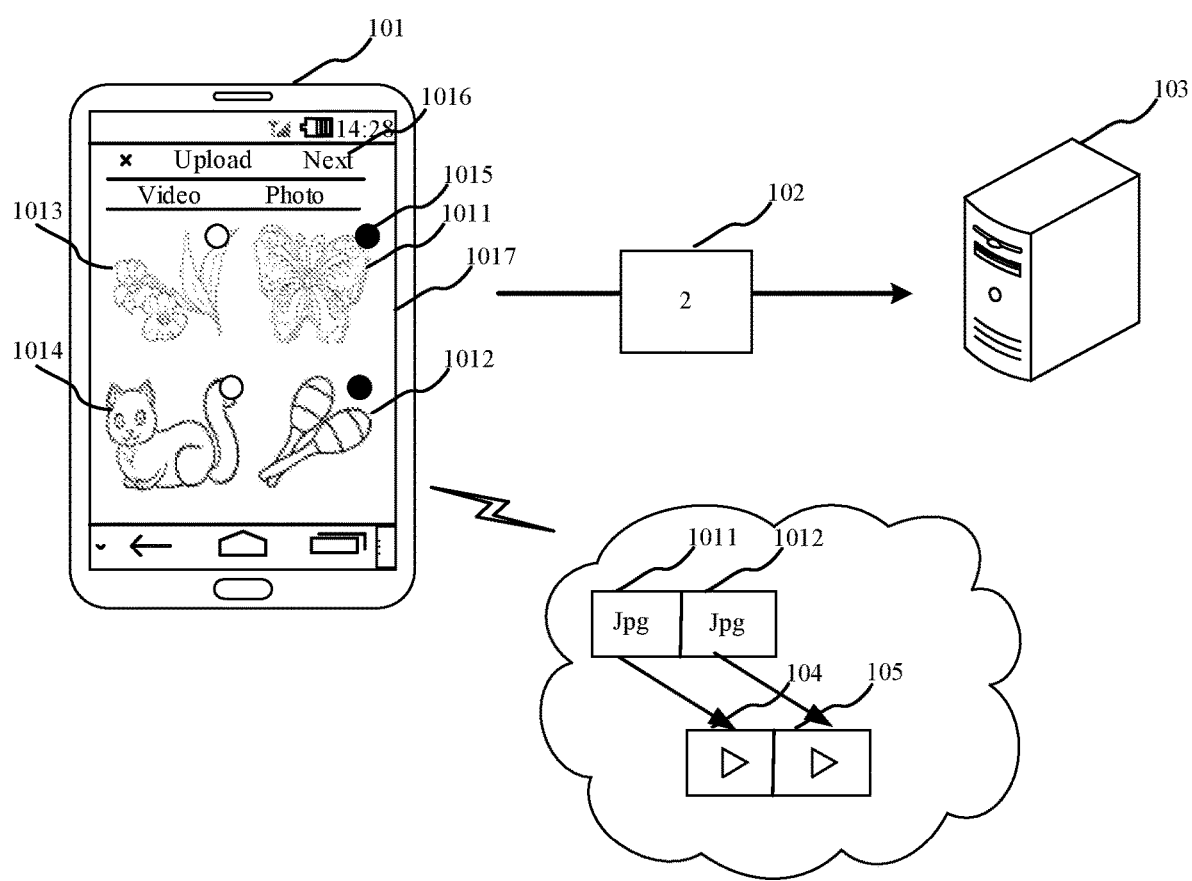
Figure 1C:
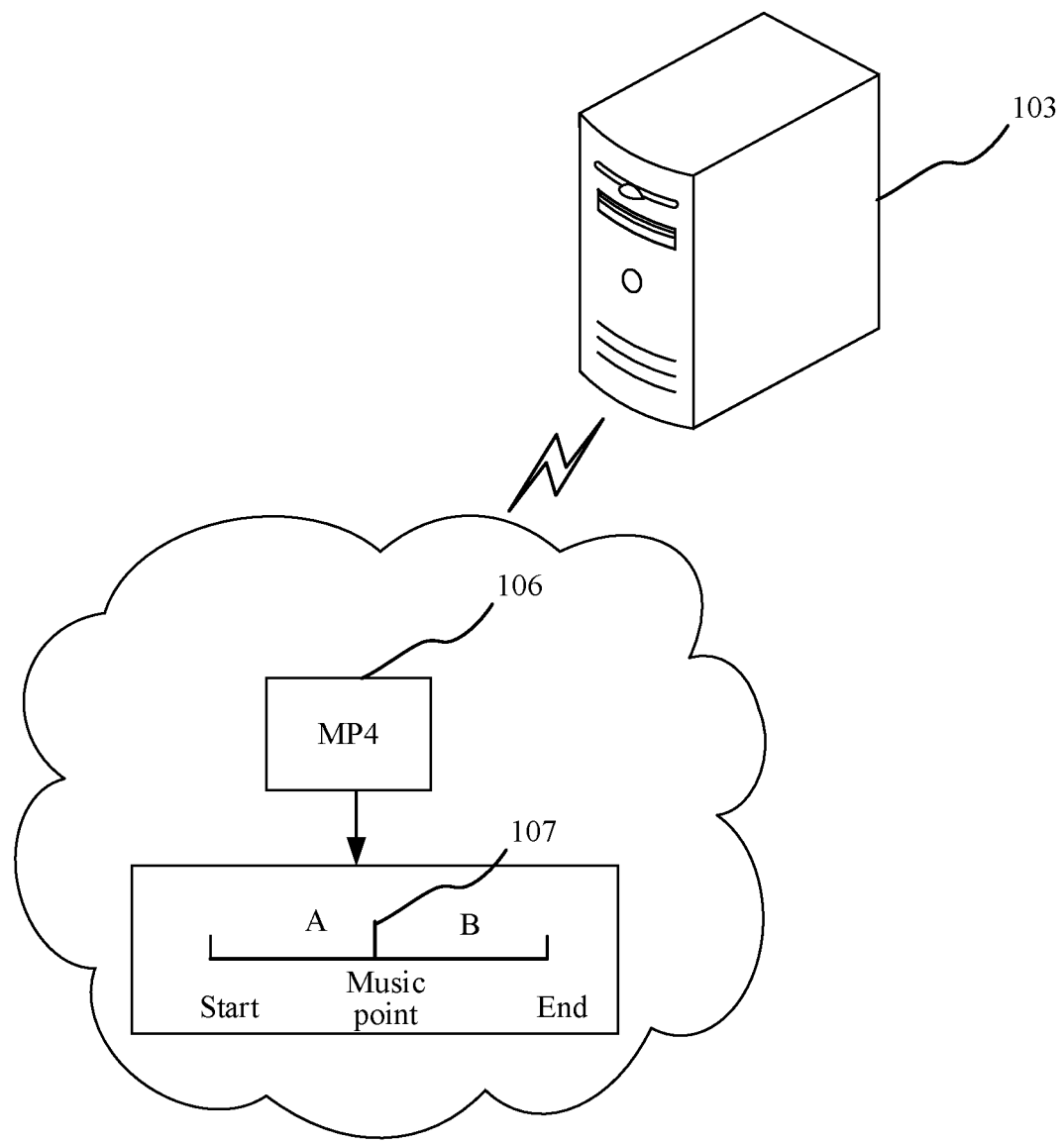
Figure 1D:
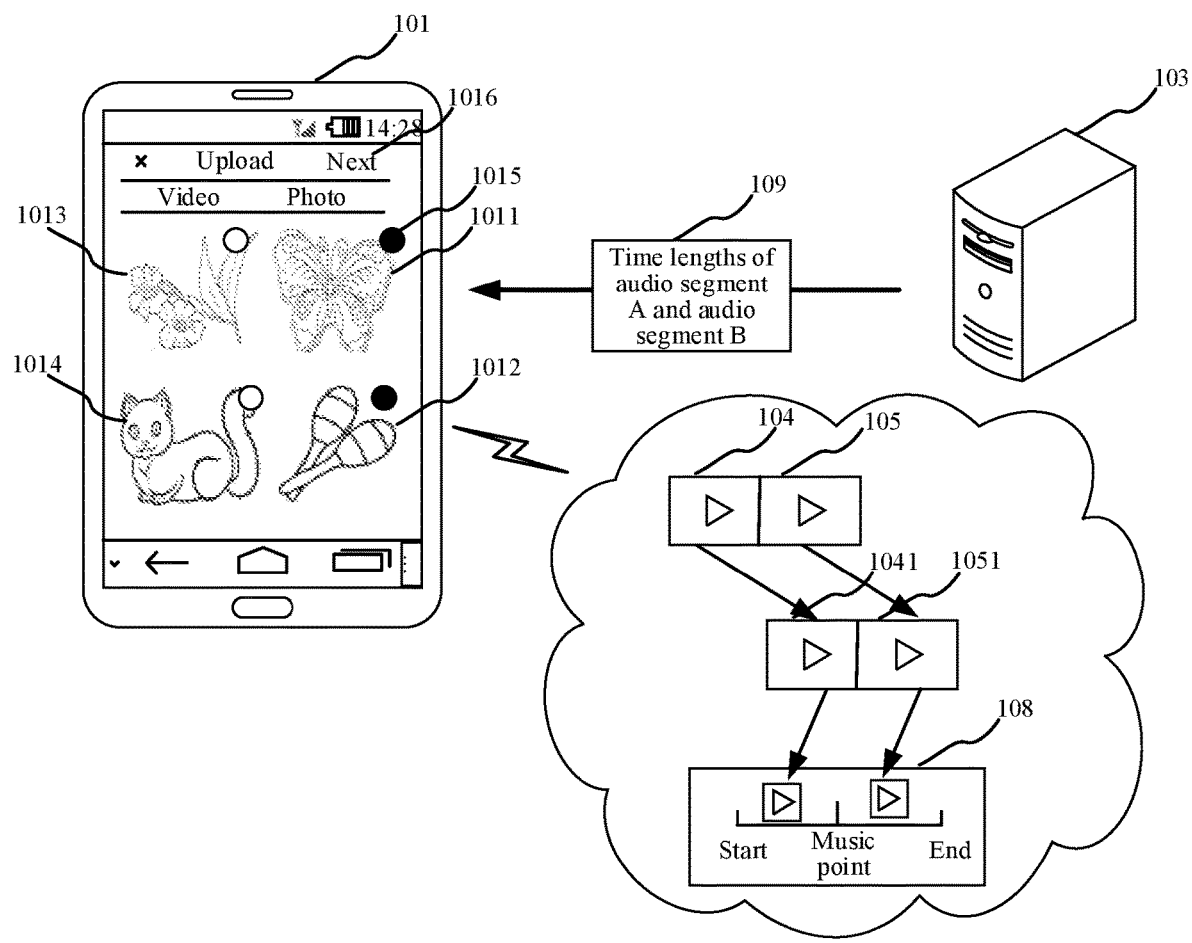

Different from the application scene shown in FIG. 1A, in the application scenes shown in FIGS. 1B to 1D, the terminal device 101 transmits image information 102 including the number (which is equal to two shown in FIGS. 1B to 1D) of image materials to a server 103. As shown in FIG. 1C, the server 103 determines a music point 107 in an obtained audio material 106, and divides the audio material 106 into an audio segment A and an audio segment B based on the music point 107. As shown in FIG. 1D, the server 103 transmits information 109, including a time length of the obtained audio segment A and a time length of the obtained audio segment B, to the terminal device 101. The terminal device 101 processes the image material 104 based on the time length of the audio segment A to obtain a video segment 1041, and processes the image material 105 based on the time length of the audio segment B to obtain a video segment 1051. The video segment 1041 has a time length same as the time length of the audio segment A, and the video segment 1051 has a time length same as the time length of the audio segment B. The terminal device 101 splices the video segments 1041 and 1051 together based on time instants at which the audio segments A and B respectively appear in the audio material 106, and adds the audio material 106 as an audio track of the spliced video, to obtain a composite video 108.

It should be understood that the method for generating a video may be performed by the terminal device 101, or may be performed by the server 103, or may be performed by interactions between the terminal device 101 and the server 103, or may be performed by various software programs. The terminal device 101 may be, for example, an electronic device having a display screen, including but not limited to a smart phone, a tablet computer, an e-book reader, a laptop computer, and a desktop computer. In addition, the execution body may be the server 103, software, or the like. In a case that the execution body is software, the software may be installed in the electronic device described above. The execution body may be implemented as, for example, multiple software or software modules for providing distributed services, or may be implemented as a single software or software module, which is not limited herein.

It should be understood that the numbers of phones and servers shown in FIG. 1 are only illustrative. Any number of phones and servers may be configured according to implementation requirements.

Figure 2:
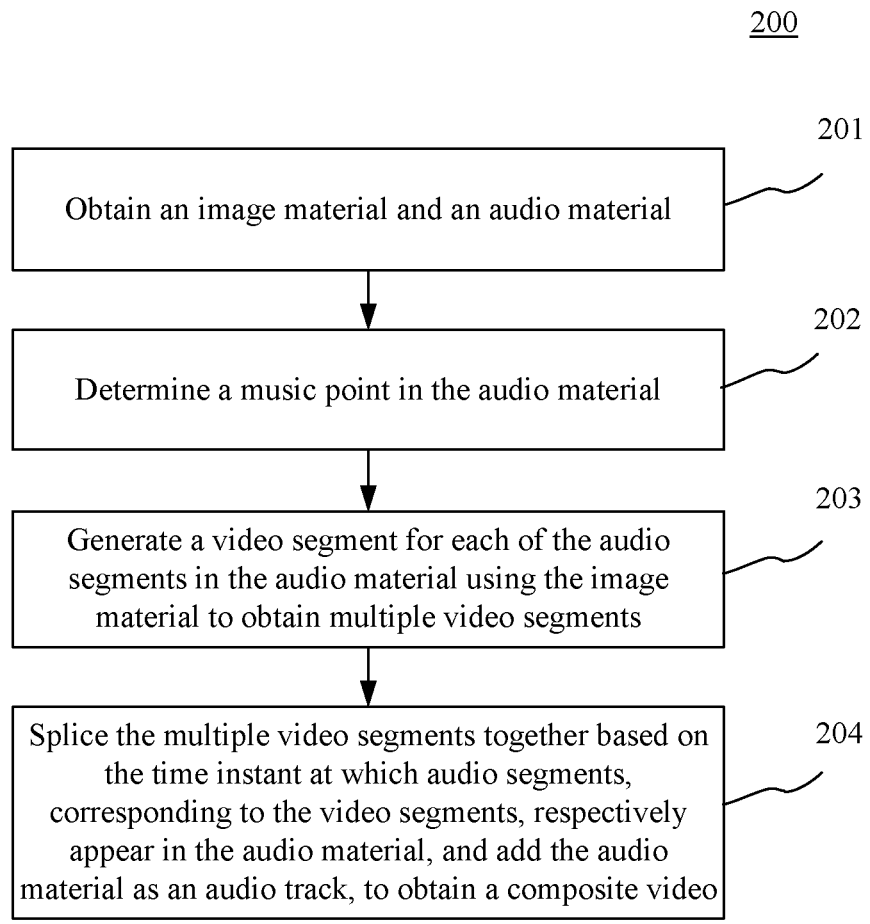
FIG. 2 is a flow chart of a method for generating a video according to some embodiments of the present disclosure.

Reference is made to FIG. 2, which shows a flow chart 200 of a method for generating a video according to some embodiments of the present disclosure. The method for generating a video includes the following steps 201 to 204.

In step 201, an image material and an audio material are obtained.

In some embodiments, the execution body (such as, the server 103 shown in FIG. 1) of the method for generating a video may obtain an image material and an audio material through wired connection or wireless connection. The image material includes a picture material. As an example, the image material may be a picture stored locally by the user, or may be a picture downloaded by the user from a network. The audio material may be music stored locally by the user or music on the network.

In some optional implementations according to some embodiments, the image material may include a video material in addition to the picture material. As an example, the video material may be a video uploaded by the user, a video stored locally by the user, or a video downloaded by the user from a network. Since the image material may include the video material and the picture material, the types of image material are increased.

In step 202, a music point in the audio material is determined.

In some embodiments, the execution body may first determine candidate music points in the audio material. The candidate music points may be points in the audio material that satisfy a preset tempo transition condition. Then, the execution body may select a target number of music points from the obtained candidate music points. The target number may be determined based on the obtained number of the image material, or may be determined based on the number of strong beats in the audio material, or may be set by the user. For example, in a case of obtaining ten image materials, nine music points may be determined. The strong beats are usually beats having strong musical force.

For example, the candidate music points represent positions in the audio material at which musicality is changed. The positions at which the musicality is changed may include a position at which the beat is changed and a position at which the melody is changed. Therefore, the candidate music points may be determined by performing the following process. The execution body may analyze the audio material to determine a beat point and a note onset. The beat point represents the position at which the beat is changed, and the note onset represents the position at which the melody is changed. Specifically, a beat analysis algorithm based on deep learning may be used to analyze the audio material to obtain the beat points in the audio material and timestamps corresponding to the beat points, and short-term spectrum analysis may be performed on the audio material to obtain the note onset in the audio material and a timestamp corresponding to the note onset. The note onset may be obtained by using an onset detector. Then, the obtained beat points and the obtained note onset are combined and de-emphasized to obtain the candidate music points.

In step 203, a video segment is generated for each of the audio segments in the audio material using the image material to obtain multiple video segments.

In some embodiments, for each of the audio segments in the audio material, the execution body may generate a video segment for the music segment based on the image material, where the video segment has a time length same as a time length of the audio segment. In an embodiment, assuming that the audio material is divided into three audio segments and the three audio segments respectively have a time length of 1 second, 2 seconds, and 3 seconds, then video segments corresponding to the audio segments respectively have a time length of 1 second, 2 seconds and 3 seconds. In an embodiment, the execution body may generate multiple video segments based on one image material. For example, assuming that the execution body obtains an image material having a time length of 10 seconds and an audio material having a time length of 8 seconds, the execution body divides the audio material into three audio segments based on music points, and the three audio segments respectively have a time length of 2 seconds, 3 seconds and 5 seconds, then the executive body may cut out three different video segments based on the image material, and the three video segments durations respectively have a time length of 2 seconds, 3 seconds and 5 seconds. In another embodiment, the execution body may generate one video segment based on one image material. For example, in a case of generating one video segment for one audio segment based on one image material, if a time length of the image material is greater than a time length of the audio segment, a video segment, having a time length equal to the time length of the audio segment, is cut out base on the image material; and if a time length of the image material is less than a time length of the audio segment, speed change processing is performed on the image material to lengthen the time length of the image material, and then the image material after speed change processing is used as a video segment, so that the time length of the video segment is equal to the time length of the audio segment. It should be understood that, for the picture material included in the image material, a video segment may be generated based on the picture material in various implementation manners.

Figure 3A:
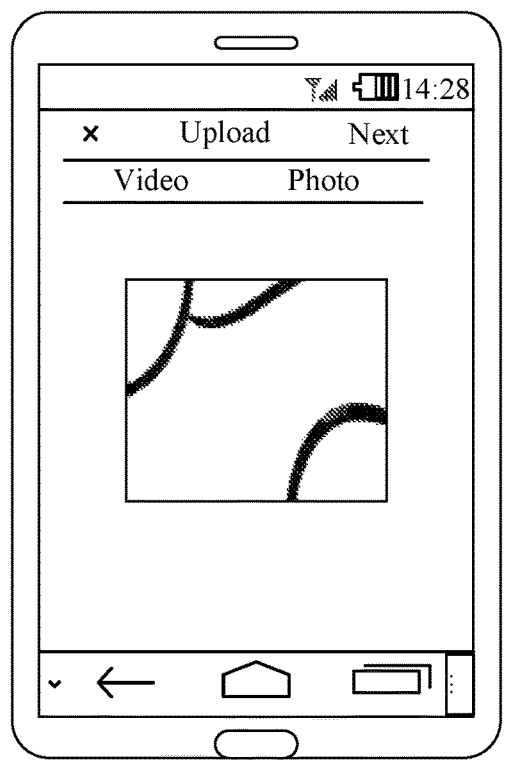
FIGS. 3A to 3D are schematic diagrams of application scenes of controlling a picture material to move according to some embodiments of the present disclosure.
Figure 3B:
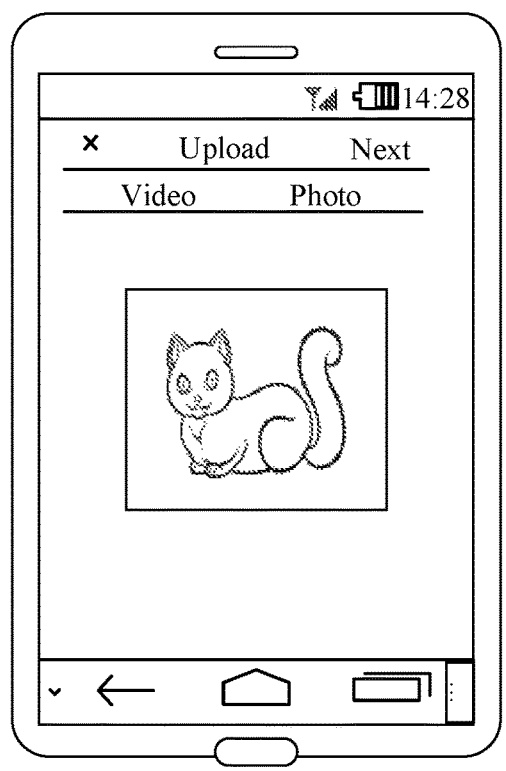
Figure 3C:
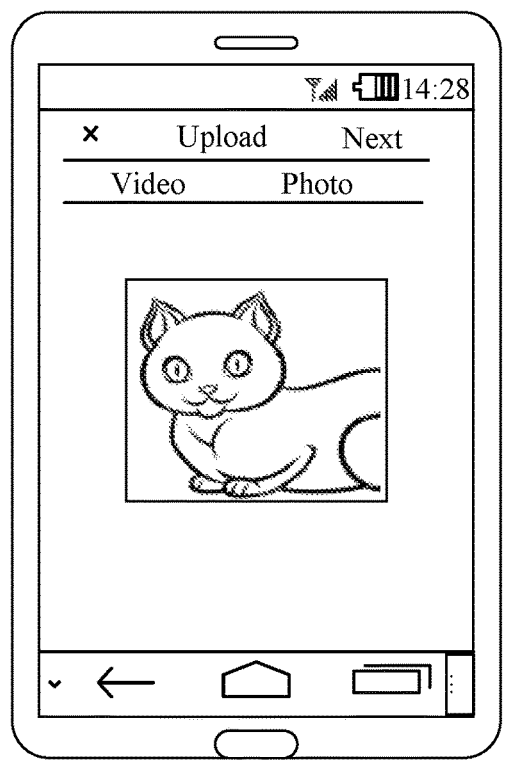
Figure 3D:
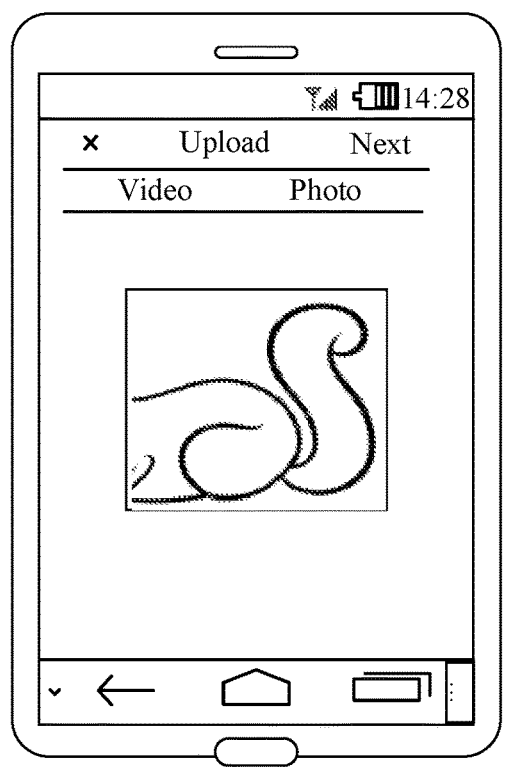

In an embodiment, the multiple generated video segments include a second video segment. The second video segment is formed by controlling the picture material to move. The second video segment may be a picture material after adding an animation effect. The animation effect may include, but are not limited to, at least one of an effect of zooming in, an effect of zooming out, an effect of moving mirror to left, and an effect of moving mirror to right. In an embodiment, for the effect of zooming in, a center area of a picture is displayed in a display frame of a page initially, as shown in FIG. 3A; then the size of the picture gradually decreases, and the area of the picture, displayed in the display frame, gradually expands until the complete picture is displayed in the display frame, as shown in FIG. 3B. For the effect of zooming out, a complete picture is displayed in a display frame of a page initially, as shown in FIG. 3B; then the size of the picture gradually increases, and the area of the picture, displayed in the display frame, gradually shrinks until a center area with a preset size of the picture is displayed in the display frame, as shown in FIG. 3A. For the effect of moving mirror to left, a preset right area of a picture is displayed in a display frame of a page initially, as shown in FIG. 3D; then the picture moves to left relative to the display frame and the area of the picture, displayed in the display frame, gradually moves to left until a preset left area of the picture is displayed in the display frame, as shown in FIG. 3C, that is, the picture moves from right to left visually. For the effect of moving mirror to right, a preset left area of a picture is displayed in a display frame of a page initially, as shown in FIG. 3C; then the picture moves to right relative to the display frame and the area of the picture, displayed in the display frame, gradually moves to right until a preset right area of the picture is displayed in the display frame, as shown in FIG. 3D, that is, the picture moves from left to right visually. By controlling the picture material to move, the conversion of the picture material and the video material may be more natural.

A motion rate of a picture may be, for example, determined based on the following equation:

$$curScale=(curTime/(EndTime-StartTime)*(EndScale-StartScale))$$

where curTime represents a time instant when a picture appears in a video, EndTime represents a time instant at which the picture stops moving, StartTime represents a time instant at which the picture starts to move, then EndTime-StartTime represents a time period in which the picture moves. For the effect of moving mirror to left and the effect of moving mirror to right, curScale may represent a position of a current display area of the picture, EndScale may represent a position of a display area of the picture after moving, StartScale may represent a position of a display area of the picture starting to move, and then EndScale-StartScale may represent a change in position of the display area of the picture in moving. For the effect of zooming in and the effect of zooming out, curScale may represent a size of a current display area of a picture, EndScale may represent a size of a display area of the picture after moving, StartScale may represent a size of a display area of the picture starting to move, and then EndScale-StartScale may represent a change in size of the display area of the picture in moving. The change in size and the change in position may be set manually.

In an embodiment, the generated multiple video segments include a first video segment. The first video segment is generated by adding an animation effect to the picture material. The first video segment may be a picture material after being added an animation effect. The animation effect may be a foreground animation effect randomly added to the picture material. The foreground animation effect may be a dynamic animation effect added to a picture. For example, a rain animation may be added to a picture. A picture material, after being added an animation effect, may be visually beautiful, thereby improving the user's visual effect.

In generating a video segment based on a picture material, a video material having a preset time length (such as 3 seconds) may be generated by adding motion or an animation effect to the picture material, and then a video segment having a time length same as the time length of the audio segment is generated based on the video material.

In some optional implementations according to some embodiments, the animation effect added to the picture material may be determined according to a scene category of the picture material. The scene category may represent a scene presented in the picture material. For example, the scene category may include, but is not limited to, at least one of a general scene category and an indoor category. The general scene category may include, but is not limited to, at least one of a baby scene, a beach scene, a building scene, a car scene, a cartoon scene, and an animal scene. The indoor category may include, but is not limited to, at least one of a bookstore scene, a cafe scene, a KTV (Karaoke) scene, and a shopping mall scene.

It should be understood that the scene category of the picture material may be obtained in various ways.

In an embodiment, the execution subject may determine whether the picture material includes preset scene information to determine the scene category. By adding an animation effect to the picture material according to the scene category, the correlation between the picture material and the animation effect may be enhanced. For example, in a case that scene information in a picture material indicates "snowman", the animation effect may be an animation effect of "fluttering snowflakes".

In another embodiment, the scene category of the picture material may be obtained by analyzing the picture material by using a machine learning model. The machine learning model has been trained based on a training sample set. The training sample set include sample picture materials and sample scene categories corresponding to the sample picture materials. The scene category is determined by using a model, improving speed and saving manpower.

In an embodiment, the machine learning model may be obtained by performing the following training steps based on the training sample set. The following training steps are performed based on the training sample set. For each of sample picture materials of at least one training sample in the training sample set, the sample picture material is inputted into an initial machine learning model to obtain a scene category corresponding to the sample picture material, and the scene category corresponding to the sample picture material is compared with a corresponding sample scene category. A prediction accuracy of the initial machine learning model is determined based on comparison results. It is determined whether the prediction accuracy is greater than a preset accuracy threshold. In a case that the prediction accuracy is greater than the preset accuracy threshold, the initial machine learning model is determined as a machine learning model that has been trained. In a case that the prediction accuracy rate is not greater than the preset accuracy threshold, parameters of the initial machine learning model are adjusted, a training sample set is formed with unused training samples, and the training steps are performed again by using the adjusted initial machine learning model as the initial machine learning model.

It should be understood that, after performing the above training steps, the machine learning model may be used to represent the correspondence between the picture material and the scene category. The machine learning model may be a convolutional neural network model.

In some optional implementations according to some embodiments, the training sample set includes sample pictures and scene categories corresponding to the sample pictures, and the machine learning model is trained with the sample pictures as inputs and with the scene categories corresponding to the sample pictures as expected outputs.

In step 204, the multiple video segments are spliced together based on time instants at which audio segments, corresponding to the video segments, respectively appear in the audio material, and the audio material is added as an audio track, to obtain a composite video.

In some embodiments, the execution body of the method for generating a video may sequentially splice the video segments, corresponding to audio segments, together according to an order in which the audio segments appear in the audio material, and add the audio material to an audio track of the spliced video, to obtain a composite video. In an embodiment, the audio material may be divided into three audio segments in sequence based on music points. For example, segment A may be from 0 seconds to 2 seconds, segment B may be from 2 seconds to 5 seconds, and segment C may be from 5 seconds to 10 seconds. Video segments, corresponding to the three audio segments, are segment a, segment b, and segment c, respectively. Then, the spliced video may be represented as abc. The audio material is added to an audio track of the spliced video abc to obtain a composite video.

It can be seen from the above embodiments that, in a case that the image material only includes a video material, the type of the image material is single, and the content of the image material is single, thereby affecting the diversity of the content of the composite video. In a case of obtaining an image material including a picture material, the types of image material may be enriched, thereby improving the diversity of the content of the composite video.

Figure 4:
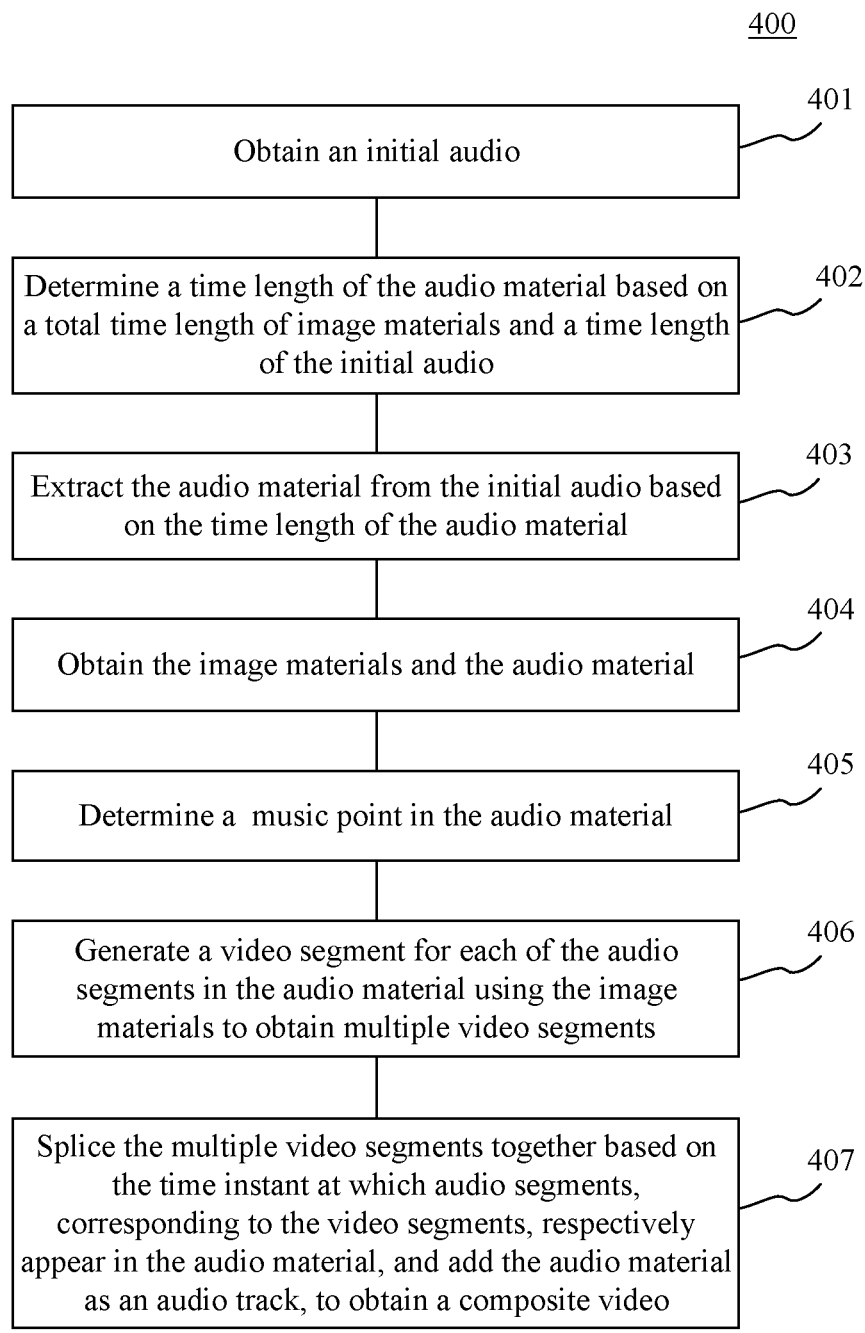
FIG. 4 is a flow chart of a method for generating a video according to some embodiments of the present disclosure.

Reference is made to FIG. 4, which shows a flow chart 200 of a method for generating a video according to some embodiments of the present disclosure. The method for generating a video includes the following steps 401 to 407.

In step S401, an initial audio is obtained.

In some embodiments, the execution body (such as, the server 103 shown in FIG. 1) of the method for generating a video may obtain an initial audio through a wired connection or a wireless connection. The initial audio may be music stored locally by the user or music on the network. For example, some music may be recommended to the user first, and if the user does not find a desired music from the recommended music, the user may manually search for other music, thereby obtaining the music selected by the user as the initial audio.

In step 402, a time length of the audio material is determined based on a total time length of the image materials and a time length of the initial audio.

In some embodiments, the execution subject may, based on obtained multiple image materials, count a total time length of all the image materials. In the image materials, the time length of the video material may be equal to the time length of the video, and the time length, such as 4 seconds, of the picture material may be set manually. The total time length is compared with the time length of the obtained initial audio. Based on a result, the time length of the audio material is determined. It is determined that the time length of the audio material is less than the total time length of the image materials.

In some optional implementations according to some embodiments, the process of determining the time length of the audio material based on the total time length of the image materials and the time length of the initial audio includes the following operations. An initial time length is determined based on the total time length of the image materials and the time length of the initial audio. The initial time length may be equal to the time length of the initial audio or the total time length of the image materials. In a case that the initial time length is greater than a time length threshold, the time length threshold is determined as the time length of the audio material. The time length threshold may be set manually, for example, the time length threshold may be 20 seconds. In a case that the initial time length is less than 20 seconds, the initial time length is determined as the time length of the audio material. The time length threshold is set for controlling the time length of the audio material.

In some optional implementations according to some embodiments, the process of determining the initial time length based on the total time length of the image materials and the time length of the initial audio includes the following operations. In a case that the total time length of the image materials is greater than the time length of the initial audio, the time length of the initial audio is determined as the initial time length; and in a case that the total time length of the image materials is less than the time length of the initial audio, the total time length of the image materials is reduced to obtain the time length of the audio material. For example, the total time length of the image material may be reduced by multiplying the total time length by a target ratio or by subtracting the total time length by a preset time length. The target ratio and the preset time length may be set manually. The preset time length is smaller than the total time length. With the above method, the time length of the audio material can be flexibly controlled.

In step 403, the audio material is extracted from the initial audio based on the time length of the audio material.

In some embodiments, the execution body extracts the audio material from the initial audio based on the time length of the audio material.

In step 404, the image materials and the audio material are obtained.

In step 405, a music point in the audio material is determined.

In step 406, for each of the audio segments in the audio material, a video segment is generated using the image materials, so that multiple video segments obtained.

In step 407, the multiple video segments are spliced together based on time instants at which audio segments, corresponding to the video segments, respectively appear in the audio material, and the audio material is added as an audio track, so that a composite video is obtained.

In some embodiments, the technical effects obtained by performing steps 404 to 407 may be refer to the technical effects by performing steps 201 to 204 in the embodiments corresponding to FIG. 2, and are not repeated herein.

In the method for generating a video according to the embodiments of the present disclosure, an initial audio is obtained, a time length of the audio material is determined based on a total time length of image materials and a time length of the initial audio, and the audio material is extracted from the initial audio. Therefore, it is achieved that the time length of the audio material is adapted to the time length of the composite video.

Figure 5:
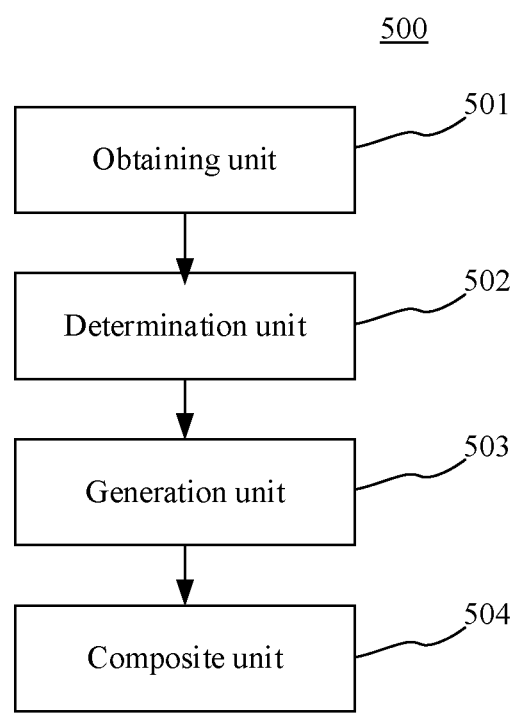
FIG. 5 is a schematic structural diagram of an apparatus for retrieving a video according to some embodiments of the present disclosure.

Referring to FIG. 5, as an implementation of the method shown in the above Figures, an apparatus for generating a video is provided according to some embodiments of the present disclosure. The apparatus embodiments correspond to the above method embodiments shown in FIG. 2. Specifically, the apparatus may be applied to various electronic devices.

As shown in FIG. 5, the apparatus 500 for generating a video according to some embodiments of the present disclosure includes: an obtaining unit 501, a determination unit 502, a generation unit 503 and a composite unit 504. The obtaining unit 501 is configured to obtain an image material and an audio material, where the image material includes a picture material. The determination unit 502 is configured to determine a music point in the audio material, where the audio material is divided into multiple audio segments based on the music point. The generation unit 503 is configured to generate a video segment for each of the audio segments in the audio material using the image material to obtain multiple video segments, where an audio segment and a video segment corresponding to the audio segment have a same time length. The composite unit 504 is configured to splice the multiple video segments together based on time instants at which audio segments, corresponding to the video segments, respectively appear in the audio material, and to add the audio material as an audio track, to obtain a composite video.

In some embodiments, the multiple video segments, generated by the generation unit 503 of the apparatus 500 for generating a video, include a first video segment generated by adding an animation effect to the picture material.

In some embodiments, in the apparatus 500 for generating a video, the animation effect added to the picture material is determined according to a scene category of the picture material.

In some embodiments, in the apparatus 500 for generating a video, the scene category of the picture material is obtained by analyzing the picture material using a machine learning model, and the machine learning model has been trained based on a training sample set.

In some embodiments, in the apparatus 500 for generating a video, the training sample set includes sample pictures and scene categories corresponding to the sample pictures, and the machine learning model is trained with the sample pictures as inputs and with the scene categories corresponding to the sample pictures as expected outputs.

In some embodiments, the multiple video segments, generated by the generation unit 503 of the apparatus 500 for generating a video, include a second video segment formed by controlling the picture material to move.

In some embodiments, the image material, obtained by the obtaining unit 501 of the apparatus 500 for generating a video, further include a video material.

In some embodiments, the multiple video segments, generated by the generation unit 503 of the apparatus 500 for generating a video, include a third video segment extracted from the video material.

In some embodiments, the apparatus 500 for generating a video further includes a first obtaining unit, a first determination unit, and an extraction unit. The first obtaining unit is configured to obtain an initial audio. The first determination unit is configured to determine a time length of the audio material based on a total time length of image materials and a time length of the initial audio, where the time length of the audio material is less than the total time length of the image materials. The extraction unit is configured to extract the audio material from the initial audio based on the time length of the audio material.

In some embodiments, the first determining unit of the apparatus 500 for generating a video includes: a first determining subunit, a second determining subunit, and a third determining subunit. The first determining subunit is configured to determine an initial time length based on the total time length of the image materials and the time length of the initial audio. The second determining subunit is configured to, in a case that the initial time length is greater than a time length threshold, determine the time length threshold as the time length of the audio material. The third determining subunit is configured to, in a case that the initial time length is less than a time length threshold, determine the initial time length as the time length of the audio material.

In some embodiments, the first determining subunit, in the first determining unit of the apparatus 500 for generating a video, is further configured to: in a case that the total time length of the image materials is greater than the time length of the initial audio, determine the time length of the initial audio as the initial time length; and in a case that the total time length of the image materials is less than the time length of the initial audio, reduce the total time length of the image materials to obtain the time length of the audio material.

Hereinafter, reference is made to FIG. 6, which shows a schematic structural diagram of an electronic device 600 (such as a server shown in FIG. 1) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 6 is only exemplary, and should not indicate any limitation to the function and application scope of the embodiments of the present disclosure.

Figure 6:
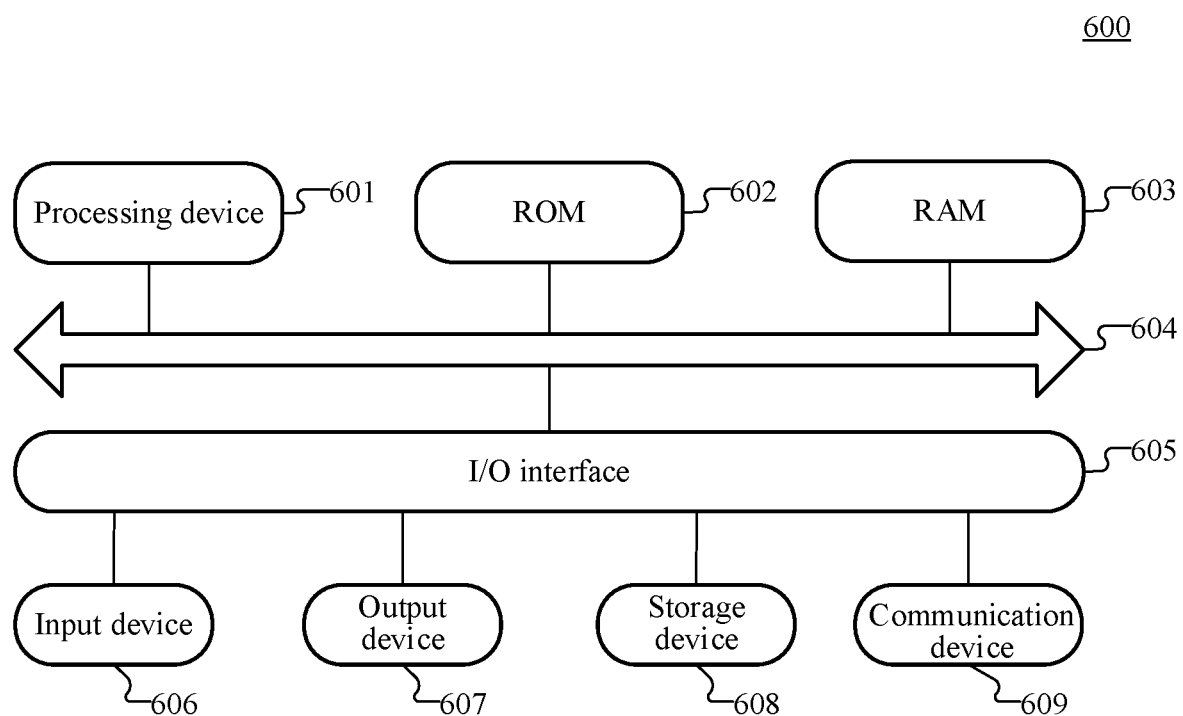
FIG. 6 is a schematic structural diagram of a computer system suitable for implementing an electronic device according to an embodiment of the present disclosure.

As shown in FIG. 6, the electronic device 600 may include a processing device 601 (such as a central processing unit and a graphics processor) which may execute various operations and processing through a program stored in a Read Only Memory (ROM) 602 or a program loaded from the storage device 608 into a Random Access Memory (RAM) 603. The RAM 603 is further configured to store various programs and data required by the electronic device 600. The processing device 601, the ROM 602 and the RAM 603 are connected to each other through a bus 604. An Input/output (I/O) interface 605 is also connected to the bus 604.

Generally, the I/O interface 605 may be connected to: an input device 606, such as a touch screen, a touch panel, a keyboard, a mouse, a camera, a microphone, an accelerometer, and a gyroscope; an output device 607, such as a liquid crystal display (LCD), a speaker, and a vibrator; a storage device 608 such as a memory card; and a communication device 609. The communication device 609 enables the electronic device 600 to perform wireless or wired communication with other devices for data exchanging. Although FIG. 6 shows an electronic device 600 having various components, it should be understood that the illustrated components are not necessarily required to all be implemented or included. Alternatively, more or fewer components may be implemented or included. Each of the blocks shown in FIG. 6 may represent one device, or may represent multiple devices as required.

Particularly, according to some embodiments of the present disclosure, the process described above in conjunction with flow charts may be implemented as a computer program. For example, a computer program product is further provided according to some embodiments of the present disclosure, including a computer program carried on a computer readable medium. The computer program includes program codes for performing the method shown in the flow charts. In the embodiments, the computer program may be downloaded and installed from the network via the communication device 609, or installed from the storage device 608, or installed from the ROM 602. When the computer program is executed by the processing device 601, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device. The computer readable medium carries one or more programs. The one or more programs, when being executed by the electronic device, cause the electronic device to: obtain an image material and an audio material, where the image material includes a picture material; determine a music point in the audio material, where the audio material is divided into multiple audio segments based on the music point; generate a video segment for each of the audio segments in the audio material using the image material to obtain multiple video segments, where an audio segment and a video segment corresponding to the audio segment have a same time length; and splice the multiple video segments together based on time instants at which audio segments, corresponding to the video segments, respectively appear in the audio material, and add the audio material as an audio track, to obtain a composite video.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The described unit may be provided in a processor. For example, it may be described as: a processor includes an obtaining unit, a determination unit, a generation unit and a composite unit. The designation of these units does not in any case constitute a qualification of the unit itself. For example, the obtaining unit may also be described as "a unit for obtaining an image material and an audio material".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

According to one or more embodiments of the present disclosure, in an example 1, a method for generating a video is provided. The method includes: obtaining an image material and an audio material, where the image material includes a picture material; determining a music point in the audio material, where the audio material is divided into multiple audio segments based on the music point; generating a video segment for each of the audio segments in the audio material using the image material to obtain multiple video segments, where an audio segment and a video segment corresponding to the audio segment have a same time length; and splicing the multiple video segments together based on time instants at which audio segments, corresponding to the video segments, respectively appear in the audio material, and adding the audio material as an audio track, to obtain a composite video.

According to one or more embodiments of the present disclosure, the multiple video segments include a first video segment generated by adding an animation effect to the picture material.

According to one or more embodiments of the present disclosure, the animation effect is determined according to a scene category of the picture material.

According to one or more embodiments of the present disclosure, the scene category of the picture material is obtained by analyzing the picture material using a machine learning model, and the machine learning model has been trained based on a training sample set.

According to one or more embodiments of the present disclosure, the training sample set includes sample pictures and scene categories corresponding to the sample pictures, and the machine learning model is trained with the sample pictures as inputs and with the scene categories corresponding to the sample pictures as expected outputs.

According to one or more embodiments of the present disclosure, the multiple video segments include a second video segment formed by controlling the picture material to move.

According to one or more embodiments of the present disclosure, the image material further includes a video material.

According to one or more embodiments of the present disclosure, the multiple video segments include a third video segment extracted from the video material.

According to one or more embodiments of the present disclosure, the method further includes: obtaining an initial audio; determining a time length of the audio material based on a total time length of image materials and a time length of the initial audio, where the time length of the audio material is less than the total time length of the image materials; and extracting the audio material from the initial audio based on the time length of the audio material.

According to one or more embodiments of the present disclosure, the determining a time length of the audio material based on a total time length of the image materials and a time length of the initial audio includes: determining an initial time length based on the total time length of the image materials and the time length of the initial audio; in a case that the initial time length is greater than a time length threshold, determining the time length threshold as the time length of the audio material; and in a case that the initial time length is less than a time length threshold, determining the initial time length as the time length of the audio material.

According to one or more embodiments of the present disclosure, the determining an initial time length based on the total time length of the image materials and the time length of the initial audio includes: in a case that the total time length of the image materials is greater than the time length of the initial audio, determining the time length of the initial audio as the initial time length; and in a case that the total time length of the image materials is less than the time length of the initial audio, reducing the total time length of the image materials to obtain the time length of the audio material.

According to one or more embodiments of the present disclosure, the apparatus includes: an obtaining unit, a determination unit, a generation unit and a composite unit. The obtaining unit is configured to obtain an image material and an audio material, where the image material includes a picture material. The determination unit is configured to determine a music point in the audio material, where the audio material is divided into multiple audio segments based on the music point. The generation unit is configured to generate a video segment for each of the audio segments in the audio material using the image material to obtain multiple video segments, where an audio segment and a video segment corresponding to the audio segment have a same time length. The composite unit is configured to splice the multiple video segments together based on time instants at which audio segments, corresponding to the video segments, respectively appear in the audio material, and to add the audio material as an audio track, to obtain a composite video.

According to one or more embodiments of the present disclosure, an electronic device is provided. The electronic device includes one or more processors and a storage device. The storage device stores one or more programs. The one or more programs, when executed by the one or more processors, cause the one or more processors to perform the method in any one of the embodiments.

According to one or more embodiments of the present disclosure, a computer-readable medium is provided. The computer-readable medium stores a computer program. The computer program, when executed by a processor, causes the processor to perform the method in any one of the embodiments.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

The invention claimed is:

1. A method for generating a video, comprising:
obtaining an image material and an audio material, wherein the image material comprises a picture material;
determining a music point in the audio material, wherein the audio material is divided into a plurality of audio segments based on the music point;
generating a video segment for each of the audio segments in the audio material using the image material to obtain a plurality of video segments, wherein an audio segment and a video segment corresponding to the audio segment have a same time length;
splicing the plurality of video segments together based on time instants at which audio segments, corresponding to the video segments, respectively appear in the audio material, and adding the audio material as an audio track, to obtain a composite video;
wherein the method further comprises:
obtaining an initial audio;
determining a time length of the audio material based on a total time length of the image material and a time length of the initial audio, wherein the time length of the audio material is less than the total time length of the image material, and wherein the determining a time length of the audio material based on a total time length of the image material and a time length of the initial audio further comprises:
determining an initial time length based on the total time length of the image material and the time length of the initial audio,
when the initial time length is greater than a time length threshold, determining the time length threshold as the time length of the audio material, and
when the initial time length is less than the time length threshold, determining the initial time length as the time length of the audio material; and
extracting the audio material from the initial audio based on the time length of the audio material.

2. The method according to claim 1, wherein the plurality of video segments comprise a first video segment generated by adding an animation effect to the picture material.

3. The method according to claim 2, wherein the animation effect is determined according to a scene category of the picture material.

4. The method according to claim 3, wherein the scene category of the picture material is obtained by analyzing the picture material using a machine learning model, and the machine learning model has been trained based on a training sample set.

5. The method according to claim 4, wherein the training sample set comprises sample pictures and scene categories corresponding to the sample pictures, and the machine learning model is trained with the sample pictures as inputs and with the scene categories corresponding to the sample pictures as expected outputs.

6. The method according to claim 1, wherein the plurality of video segments comprise a second video segment formed by controlling the picture material to move.

7. The method according to claim 1, wherein the image material further comprises a video material.

8. The method according to claim 7, wherein the plurality of video segments comprise a third video segment extracted from the video material.

9. The method according to claim 1, wherein the determining an initial time length based on the total time length of the image material and the time length of the initial audio comprises:
when the total time length of the image material is greater than the time length of the initial audio, determining the time length of the initial audio as the initial time length; and
when the total time length of the image material is less than the time length of the initial audio, reducing the total time length of the image material to obtain the time length of the audio material.

10. An apparatus for generating a video, comprising:
one or more processors; and
a storage device, storing one or more programs; wherein the one or more programs, when executed by the one or more processors, cause the one or more processors to perform operations comprising:
obtaining an image material and an audio material, wherein the image material comprises a picture material;
determining a music point in the audio material, wherein the audio material is divided into a plurality of audio segments based on the music point;
generating a video segment for each of the audio segments in the audio material using the image material to obtain a plurality of video segments, wherein an audio segment and a video segment corresponding to the audio segment have a same time length;
splicing the plurality of video segments together based on time instants at which audio segments, corresponding to the video segments, respectively appear in the audio material, and to add the audio material as an audio track, to obtain a composite video;
wherein the operations further comprise:
obtaining an initial audio;
determining a time length of the audio material based on a total time length of the image material and a time length of the initial audio, wherein the time length of the audio material is less than the total time length of the image material, and wherein the determining a time length of the audio material based on a total time length of the image material and a time length of the initial audio further comprises:
determining an initial time length based on the total time length of the image material and the time length of the initial audio,
when the initial time length is greater than a time length threshold, determining the time length threshold as the time length of the audio material, and
when the initial time length is less than the time length threshold, determining the initial time length as the time length of the audio material; and
extracting the audio material from the initial audio based on the time length of the audio material.

11. The apparatus according to claim 10, wherein the plurality of video segments comprise a first video segment generated by adding an animation effect to the picture material.

12. The apparatus according to claim 11, wherein the animation effect is determined according to a scene category of the picture material.

13. The apparatus according to claim 12, wherein the scene category of the picture material is obtained by analyzing the picture material using a machine learning model, and the machine learning model has been trained based on a training sample set.

14. The apparatus according to claim 13, wherein the training sample set comprises sample pictures and scene categories corresponding to the sample pictures, and the machine learning model is trained with the sample pictures as inputs and with the scene categories corresponding to the sample pictures as expected outputs.

15. The apparatus according to claim 10, wherein the plurality of video segments comprise a second video segment formed by controlling the picture material to move.

16. The apparatus according to claim 10, wherein the image material further comprises a video material.

17. The apparatus according to claim 16, wherein the plurality of video segments comprise a third video segment extracted from the video material.

18. A non-transitory computer-readable storage medium storing a computer program, wherein the computer program, when executed by a processor, causes the processor to perform operations comprising:
obtaining an image material and an audio material, wherein the image material comprises a picture material;
determining a music point in the audio material, wherein the audio material is divided into a plurality of audio segments based on the music point;
generating a video segment for each of the audio segments in the audio material using the image material to obtain a plurality of video segments, wherein an audio segment and a video segment corresponding to the audio segment have a same time length;
splicing the plurality of video segments together based on time instants at which audio segments, corresponding to the video segments, respectively appear in the audio material, and adding the audio material as an audio track, to obtain a composite video;
wherein the operations further comprise:
obtaining an initial audio;
determining a time length of the audio material based on a total time length of the image material and a time length of the initial audio, wherein the time length of the audio material is less than the total time length of the image material, and wherein the determining a time length of the audio material based on a total time length of the image material and a time length of the initial audio further comprises:
determining an initial time length based on the total time length of the image material and the time length of the initial audio,
when the initial time length is greater than a time length threshold, determining the time length threshold as the time length of the audio material, and
when the initial time length is less than the time length threshold, determining the initial time length as the time length of the audio material; and
extracting the audio material from the initial audio based on the time length of the audio material.

19. The non-transitory computer-readable storage medium of claim 18, wherein the plurality of video segments comprise a first video segment generated by adding an animation effect to the picture material, and wherein the animation effect is determined based on a scene category of the picture material.

20. The non-transitory computer-readable storage medium of claim 19, wherein the scene category of the picture material is determined by analyzing the picture material using a machine learning model, and wherein the machine learning model has been trained based on a training sample set.

* * * * *